(12) United States Patent
Xiong et al.

(10) Patent No.: US 11,230,012 B2
(45) Date of Patent: *Jan. 25, 2022

(54) SERVO CALIBRATION METHOD AND APPARATUS AND ROBOT USING THE SAME

(71) Applicant: UBTECH ROBOTICS CORP LTD, Shenzhen (CN)

(72) Inventors: Youjun Xiong, Shenzhen (CN); Hanyu Sun, Shenzhen (CN); Wenhua Fan, Shenzhen (CN); Lifu Zhang, Shenzhen (CN); Zhongliang Wang, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 321 days.

This patent is subject to a terminal disclaimer.

(21) Appl. No.: 16/508,335

(22) Filed: Jul. 11, 2019

(65) Prior Publication Data

US 2020/0206935 A1 Jul. 2, 2020

(30) Foreign Application Priority Data

Dec. 28, 2018 (CN) .......................... 201811623258.1

(51) Int. Cl.
  *B25J 19/02* (2006.01)
  *B25J 9/16* (2006.01)

(52) U.S. Cl.
  CPC ............. *B25J 9/1692* (2013.01); *B25J 19/02* (2013.01)

(58) Field of Classification Search
  CPC ... B25J 9/1692; B25J 9/02; B25J 19/02; B25J 9/1602; B60W 10/06; B60W 2710/06;
  (Continued)

(56) References Cited

U.S. PATENT DOCUMENTS 10,685,672 B2 * 6/2020 Xiong ..................... G11B 5/584
10,727,821 B2 * 7/2020 Xiong .................. H03K 5/2472
(Continued)

FOREIGN PATENT DOCUMENTS

CN 107160366 A 9/2017
CN 108748158 A 11/2018

OTHER PUBLICATIONS

Gebler et al., Identification and compensation of gear backlash without output position sensor in high-precision servo systems, 1998, IEEE, p. 662-666 (Year: 1998).*

(Continued)

*Primary Examiner* — McDieunel Marc

(57) ABSTRACT

A servo calibration method as well as an apparatus and a robot using the same are provided. The method includes: obtaining data of a position sensor on a motor shaft of the servo; obtaining data of a position sensor on an output shaft of the servo; determining whether a clutch protection has been performed on the servo based on data of the position sensor on the motor shaft and data of the position sensor on the output shaft; and calibrating a position of the motor shaft based on the data of the position sensor on the output shaft, if the clutch protection has been performed on the servo. Hence, the problem in the prior art that the process of the calibration is cumbersome can be solved.

20 Claims, 5 Drawing Sheets

(58) Field of Classification Search
CPC . B60W 2510/0208; B60W 2510/1015; B60W 2710/023; B60W 2510/0283; F16H 2342/04; Y10S 903/906; Y10T 477/26; Y10T 477/32; Y10T 477/6403; Y10T 477/70; G05B 2219/41099; A61B 34/30; A61B 2034/306; A61B 2090/067; A61B 17/16; A61B 2034/2059
See application file for complete search history.

(56) References Cited

U.S. PATENT DOCUMENTS

| | | | | |
|---|---|---|---|---|
| 2005/0177294 | A1* | 8/2005 | Jiang | F16D 48/066 701/67 |
| 2009/0293828 | A1* | 12/2009 | Iwata | F02D 41/067 123/179.18 |
| 2015/0112524 | A1* | 4/2015 | Wang | B60W 10/08 701/22 |
| 2018/0050609 | A1* | 2/2018 | Meyer | B60W 10/08 |
| 2018/0050687 | A1* | 2/2018 | Meyer | B60W 10/08 |
| 2020/0212897 | A1* | 7/2020 | Xiong | H02P 23/18 |
| 2021/0122354 | A1* | 4/2021 | Robison | B60W 10/026 |
| 2021/0175832 | A1* | 6/2021 | Khan | H02P 27/08 |

OTHER PUBLICATIONS

Sugahara et al., A human-powered joint drive mechanism using regenerative clutches, 2017, IEEE, p. 6337-6342 (Year: 2017).*
Leonhard, Trajectory control of a multi-axes robot with electrical servo drives, 1990, IEEE, p. 3-9 (Year: 1990).*
Wekhande et al., High-resolution absolute position Vernier shaft encoder suitable for high-performance PMSM servo drives, 2006, IEEE, p. 357-364 (Year: 2006).*
"Feibiaozhun Jixie Sheji Shouce", Cen Junjian et al., pp. 745-746, National Defense Industry Press, Jul. 2008.
"Industrial Robot Technology Foundation and Application", Zhang Mingwen, p. 121, Harbin Institute of Technology Press, Aug. 2017.
"CNC Woodworking Machine Tool", Hua Jun et al., pp. 163-164, Northeast Forestry University Press, Dec. 2010.

* cited by examiner

SERVO CALIBRATION METHOD AND APPARATUS AND ROBOT USING THE SAME

TRAVERSE REFERENCE TO RELATED APPLICATION PROGRAMS

This application claims priority to Chinese Patent Application No. CN 201811623258.1, filed Dec. 28, 2018, which is hereby incorporated by reference herein as if set forth in its entirety.

BACKGROUND

1. Technical Field

The present disclosure relates to robot technology, and particularly to a servo calibration method as well as an apparatus and a robot using the same.

2. Description of Related Art

Servo is a common position execution component for a joint of a robot. In order to prevent the gears in a servo from being damaged when subjected to external force impact or overload, it usually adds a mechanical structure with clutch protection to an output shaft of the servo. When a clutch protection is performed, the servo needs to be powered off and restarted to calibrate, hence the process of the calibration is cumbersome.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It should be understood that, when used in this specification and the claims, the term "comprise" or "include" indicates the existence of the described feature, entirety, step, operation, element, and/or component, while the existence or addition of other feature, entirety, step, operation, element, component, and/or their combination is not excluded.

It should be understood that, the sequence of the serial number of the steps in this embodiment does not mean the execution order while the execution order of each process should be determined by its function and internal logic, which should not be taken as any limitation to the implementation process of the embodiments.

For the purpose of describing the technical solutions of present disclosure, the following describes through specific embodiments.

Figure 1:
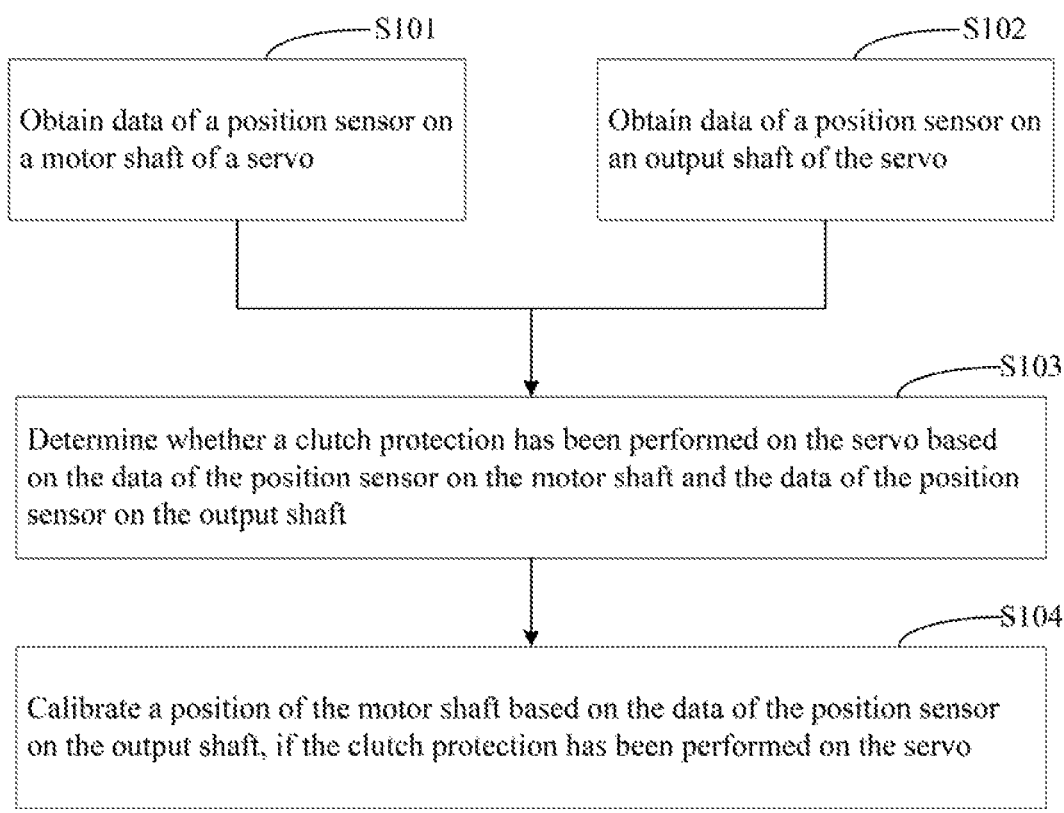
FIG. 1 is a flow chart of a servo calibration method according to a first embodiment of the present disclosure.

FIG. 1 is a flow chart of a servo calibration method according to a first embodiment of the present disclosure. For the convenience of explanation, only the parts related to this embodiment are shown. In this embodiment, a calibration method for a servo is provided. The method is a computer-implemented method executable for a processor, which may be implemented through and applied to a servo calibration apparatus shown in FIG. 4 or a robot shown in FIG. 5, or implemented through a storage medium. In which, the servo is driven by a motor, and may be used as a joint of the robot so as to realize the movement of a limb of the robot which connected to the joint. As shown in FIG. 1, the method includes the following steps.

S101: obtaining data of a position sensor on a motor shaft of the servo.

In this embodiment, in order to improve the performance of the control of the servo, a position sensor can be installed on each of the motor shaft and an output shaft of the servo. The position sensor on the output shaft of the servo is for performing a position calibration on the position sensor on the motor shaft whenever the servo is powered on. After the calibration, the actual position control of the servo is based on data of the position sensor on the motor shaft, and the position of the output shaft is calculated through a reduction ratio of a gear reducer (i.e., a gear reduction box). A rotational angle of the output shaft of the servo is controlled based on the position of the output shaft. For example, after calibration, if the data of the position sensor on the motor shaft is 120° and the reduction ratio is 60:1, a rotational angle of the output shaft is 2°, which can control the output shaft of the servo to rotate by 2°.

Figure 2:
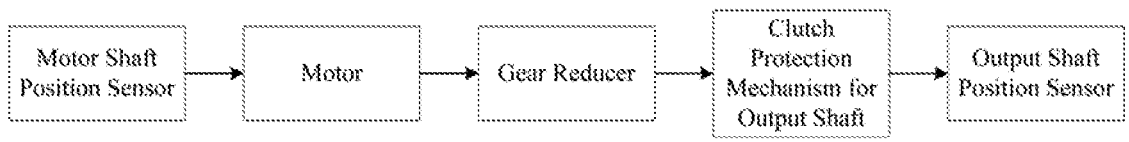
FIG. 2 is a schematic block diagram of the structure of a servo according to the embodiment of FIG. 1.

FIG. 2 is a schematic block diagram of the structure of a servo according to the embodiment of FIG. 1. As shown in FIG. 2, the servo includes the position sensor of the motor shaft, the motor, the gear reducer, a clutch protection mechanism for the output shaft, and the position sensor of the output shaft. The position sensor of the motor shaft is mounted on the motor shaft, the clutch protection mechanism for the output shaft is mounted on the output shaft, the position sensor of the output shaft is mounted on the output shaft. The position sensor of the motor shaft is for detecting the rotational angle of the motor shaft; the position sensor of the output shaft is for detecting the rotational angle of the output shaft; and the gear reducer realizes the deceleration of the motor shaft to the output shaft, for example, if the reduction ratio of the gear reducer is 60:1 and the rotational angle of the motor shaft is 300°, the rotational angle of the output shaft should be 5°.

In this embodiment, the data of the position sensor on the motor shaft may refer to a rotational angle of the motor shaft at a current position of the motor shaft with respect to an initial position (usually be 0°) of the motor shaft, that is, the position sensor on the motor shaft detects the absolute current position of the motor shaft.

S102: obtaining data of the position sensor on the output shaft of the servo.

In this embodiment, the data of the position sensor on the output shaft may refer to a rotational angle of the output shaft at a current position of the output shaft with respect to an initial position (usually be 0°) of the output shaft, that is, the position sensor on the output shaft detects the absolute current position of the output shaft.

S103: determining whether a clutch protection has been performed on the servo based on the data of the position sensor on the motor shaft and the data of the position sensor on the output shaft.

In this embodiment, the servo can determine whether or not the clutch protection is performed on itself based on the data of the position sensor on the motor shaft and the data of the position sensor on the output shaft. In such a manner, whether or not the clutch protection is performed can be realized without modifying a control program of a motherboard of the robot.

S104: calibrating a position of the motor shaft based on the data of the position sensor on the output shaft, if the clutch protection has been performed on the servo.

In this embodiment, if the clutch protection has been performed on the servo, it is determined that the servo needs to be calibrated, and a position estimation value of the motor shaft can be calculated based on the data of the position sensor on the output shaft, and then the motor shaft is adjusted to a position corresponding to the position estimation value. For example, if the calculated position estimation value of the motor shaft is 120°, then the rotational angle of the motor shaft is adjusted to 120°, that is, the data detected by the position sensor on the motor shaft is 120°. If the clutch protection has not been performed on the servo, it is determined that the servo motor not needs to be calibrated, and the data of the position sensor on the motor shaft and the data of the position sensor on the output shaft are continuously obtained to determine whether the clutch protection has been performed.

In this embodiment, the data of the position sensor on the motor shaft of the servo and the data of the position sensor on the output shaft of the servo are obtained, and whether the clutch protection has been performed on the servo based on the data of the position sensor on the motor shaft and the data of the position sensor on the output shaft is determined, and then the position of the motor shaft is calibrated based on the data of the position sensor on the output shaft if the clutch protection has been performed, thereby performing the calibration of the servo without power-off and restarting, which simplifies the calibration process of the servo and improves the calibration efficiency of the servo.

Figure 3:
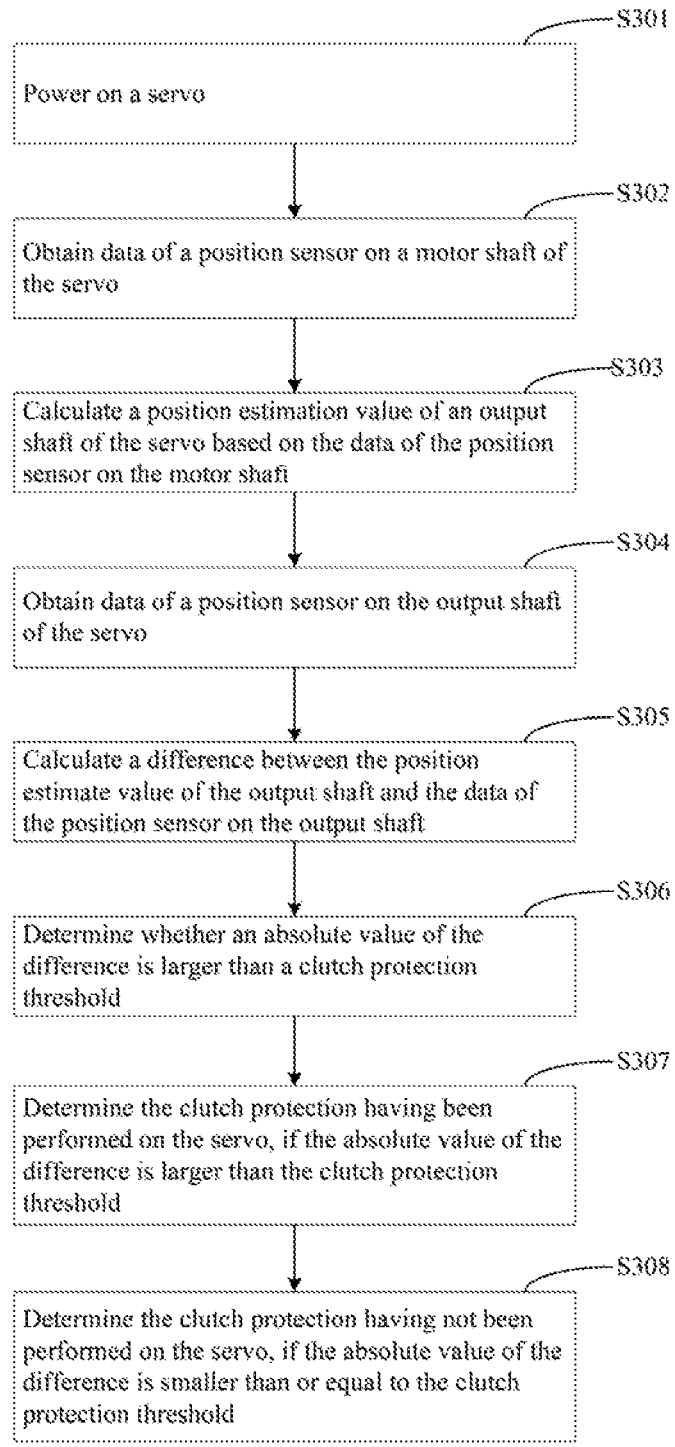
FIG. 3 is a flow chart of a servo calibration method according to a second embodiment of the present disclosure.

FIG. 3 is a flow chart of a servo calibration method according to a second embodiment of the present disclosure. As shown in FIG. 3, the method includes the following steps.

S301: powering on the servo.

In this embodiment, whenever the servo is powered on, it may determine whether the clutch protection has been performed first, and the position of the motor shaft of the servo is calibrated by using the data of the position sensor on the output shaft of the servo, thereby realizing the automatic calibration of the servo.

S302: obtaining data of a position sensor on a motor shaft of the servo.

This step is the same as the step S101. For details, refer to the related description of step S101, which is not described herein.

S303: calculating a position estimation value of the output shaft of the servo based on the data of the position sensor on the motor shaft.

In one embodiment, the step S303 includes:

calculating the position estimation value of the output shaft based on the data of the position sensor on the motor shaft and a reduction ratio of a gear reducer of the servo.

In this embodiment, since the reduction ratio of the gear reducer is generally fixed in the servo, before calculating the position estimation value of the output shaft, the reduction ratio of the gear reducer of the servo can be obtained first, then the position estimation value of the output shaft is calculated based on the data of the position sensor on the motor shaft and the obtained reduction ratio, that is, the data of the position sensor of the motor shaft is divided by the reduction ratio to obtain the position estimation value of the output shaft. For example, if the reduction ratio of the gear reducer is 60:1 and the data of the position sensor of the motor shaft is 360°, the position estimation value of the output shaft is 6°. In which, the position estimation value of the output shaft refers to the position of the output shaft calculated based on the data of the position sensor on the motor shaft.

S304: obtaining data of a position sensor on the output shaft of the servo.

This step is the same as the step S102. For details, refer to the related description of the step S102, which is not described herein.

S305: calculating a difference between the position estimate value of the output shaft and the data of the position sensor on the output shaft.

S306: determining whether an absolute value of the difference is larger than a clutch protection threshold.

It should be noted that, during the movement of the servo, due to the problems that there are delays in the transmissions of the gears in the gear reducer of the servo and there are meshing gaps between the gears, while the position sensors have detection errors, there is a possibility that the position estimation value of the output shaft and the data of the position sensor on the output shaft cannot be guaranteed to be completely equal. In actual tests, it will be found that there is a certain error between the two. Therefore, the clutch protection threshold cannot be set too small, so as to avoid the misjudgments during normal operations. On the other hand, the clutch protection threshold cannot be set too large, because small impact forces cannot be detected if it is set too large. Therefore, the clutch protection threshold needs to be determined by debugging according to the actual situation. For example, the clutch protection threshold can be set to 1° or 2°.

In one embodiment, if the absolute value of the difference is less than or equal to the clutch protection threshold, it is determined that the clutch protection has not been performed on the servo.

Exemplarily, if the clutch protection threshold is 1°, the data of the position sensor on the output shaft is 2°, and the position estimation value of the output shaft is 5°, the absolute value of the difference between the position estimate value of the output shaft and the data of the position sensor on the output shaft is 3°. Since 3° is greater than 1°, it can be determined that the clutch protection has been performed on the servo.

S307: determining the clutch protection having been performed on the servo, if the absolute value of the difference is larger than the clutch protection threshold.

S308: determining the clutch protection having not been performed on the servo, if the absolute value of the difference is smaller than or equal to the clutch protection threshold.

In this embodiment, the reduction ratio of the gear reducer of the servo can be obtained first, and the product of the data of the position sensor on the output shaft and the reduction ratio of the gear reducer of the servo, that is, the position estimate value of the motor shaft, is calculated, and then the motor shaft is adjusted to a position corresponding to the position estimate value. For example, if the data of the position sensor on the output shaft is 2° and the reduction ratio of the gear reducer is 60:1, the position estimate value of the motor shaft is 120°.

In this embodiment, whenever the servo is powered on, whether the clutch protection has been performed on the servo based on the data of the position sensor on the motor shaft and the data of the position sensor on the output shaft is determined, and then the position of the motor shaft is calibrated based on the data of the position sensor on the output shaft if the clutch protection has been performed, thereby performing the calibration of the servo without power-off and restarting, which simplifies the calibration process of the servo and improves the calibration efficiency of the servo.

Figure 4:
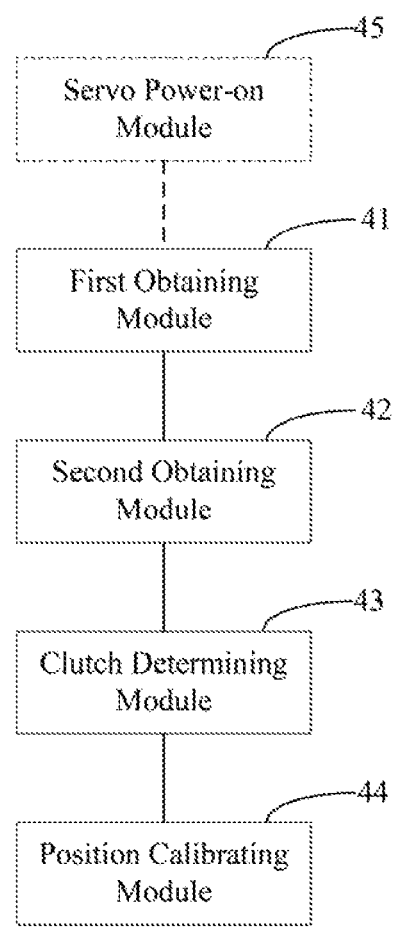
FIG. 4 is a schematic block diagram of a servo calibration apparatus according to a third embodiment of the present disclosure.
Figure 5:
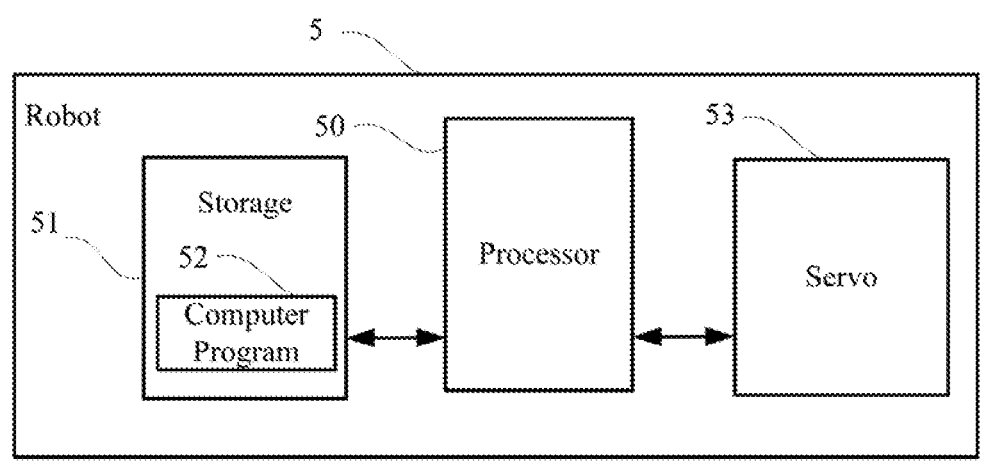
FIG. 5 is a schematic block diagram of a robot according to a fourth embodiment of the present disclosure.

FIG. 4 is a schematic block diagram of a servo calibration apparatus according to a third embodiment of the present disclosure. For the convenience of explanation, only the parts related to this embodiment are shown. In this embodiment, a servo calibration apparatus corresponding to the servo calibration method of the forgoing embodiments which is for a robot as shown in FIG. 5 is provided. As shown in FIG. 4, the servo calibration apparatus includes:

a first obtaining module 41 configured to obtain data of a position sensor on a motor shaft of the servo;

a second obtaining module 42 configured to obtain data of a position sensor on an output shaft of the servo;

a clutch determining module 43 configured to determine whether a clutch protection has been performed on the servo based on data of the position sensor on the motor shaft and data of the position sensor on the output shaft; and a position calibrating module 44 configured to calibrate a position of the motor shaft based on the data of the position sensor on the output shaft, in response to the clutch protection having been performed on the servo.

In one embodiment, the clutch determining module 43 includes:

a first calculating unit configured to calculate a position estimation value of the output shaft based on the data of the position sensor on the motor shaft;

a second calculating unit configured to calculate a difference between the position estimate value of the output shaft and the data of the position sensor on the output shaft;

a threshold determining unit configured to determine whether an absolute value of the difference is larger than a clutch protection threshold;

a first determining unit configured to determine the clutch protection having been performed on the servo, in response to the absolute value of the difference being larger than the clutch protection threshold; and a second determining unit configured to determine the clutch protection having not been performed on the servo, in response to the absolute value of the difference being smaller than or equal to the clutch protection threshold.

In one embodiment, the first calculating trait is configured to:

calculate the position estimation value of the output shaft based on the data of the position sensor on the motor shaft and a reduction ratio of a gear reducer of the servo.

In one embodiment, the servo calibration apparatus further includes:

a servo power-on module 45 configured to power on the servo.

In one embodiment, the position calibrating module 44 is configured to:

calculate the position estimation value of the motor shaft based on the data of the position sensor on the data of the position sensor on the output shaft and the reduction ratio of the gear reducer of the servo; and adjust the motor shaft a position corresponding to the position estimation value.

In this embodiment, the first obtaining module 41, the second obtaining module 42, the clutch determining module 43, and the position calibrating module 44 are implemented in the form of software, which can be computer program(s) stored in a memory of the servo calibration apparatus and executable on a processor of the servo calibration apparatus. In other embodiments, the first obtaining module 41, the second obtaining module 42, the clutch determining module 43, and the position calibrating module 44 may be implemented in the form of hardware (e.g., a circuit of the servo calibration apparatus which is coupled to the processor of the servo calibration apparatus) or a combination of hardware and software (e.g., a circuit with a single chip microcomputer).

FIG. 5 is a schematic block diagram of a robot according to a fourth embodiment of the present disclosure. For the convenience of explanation, only the parts related to this embodiment are shown. As shown in FIG. 5, in this embodiment, the robot 5 includes a processor 50, a memory 51, a computer program 52 stored in the memory 51 and executable on the processor 50, and at least a servo 53. When executing (instructions in) the computer program 52, the processor 50 implements the steps in the above-mentioned embodiments of the servo calibration method, for example, steps S101-S104 shown in FIG. 1. Alternatively, when the processor 50 executes the (instructions in) computer program 52, the functions of each module/unit in the above-mentioned device embodiments, for example, the functions of the modules 41-45 shown in FIG. 4 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the robot 5. For example, computer program 52 can be divided into a first obtaining module, a second obtaining module, a clutch determining module, and a position calibrating module. The functions of each module are as follows:

a first obtaining module configured to obtain data of a position sensor on a motor shaft of the servo;

a second obtaining module configured to obtain data of a position sensor on an output shaft of the servo;

a clutch determining module configured to determine whether a clutch protection has been performed on the servo based on data of the position sensor on the motor shaft and data of the position sensor on the output shaft; and a position calibrating module configured to calibrate a position of the motor shaft based on the data of the position sensor on the output shaft, in response to the clutch protection having been performed on the servo.

In one embodiment, the clutch determining module includes:

a first calculating unit configured to calculate a position estimation value of the output shaft based on the data of the position sensor on the motor shaft;

a second calculating unit configured to calculate a difference between the position estimate value of the output shaft and the data of the position sensor on the output shaft;

a threshold determining unit configured to determine whether an absolute value of the difference is larger than a clutch protection threshold;

a first determining unit configured to determine the clutch protection having been performed on the servo, in response to the absolute value of the difference being larger than the clutch protection threshold; and a second determining unit configured to determine the clutch protection having not been performed on the servo, in response to the absolute value of the difference being smaller than or equal to the clutch protection threshold.

In one embodiment, the first calculating unit is configured to:

calculate the position estimation value of the output shaft based on the data of the position sensor on the motor shaft and a reduction ratio of a gear reducer of the servo.

In one embodiment, the servo calibration apparatus further includes:

a servo power-on module configured to power on the servo.

In one embodiment, the position calibrating module is configured to:

calculate the position estimation value of the motor shaft based on the data of the position sensor on the data of the position sensor on the output shaft and the reduction ratio of the gear reducer of the servo; and adjust the motor shaft to a position corresponding the position estimation value.

It can be understood by those skilled in the art that FIG. 5 is merely an example of the robot 5 and does not constitute a limitation on the robot 5, and may include more or fewer components than those shown in the figure, or a combination of some components or different components. For example, the robot 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program 52 and other programs and data required by the robot 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented calibration method for a servo, comprising executing on a processor the steps of:
    obtaining data of a position sensor on a motor shaft of the servo, wherein the servo is used as a joint of a robot so as to realize a movement of a limb of the robot which is connected to the joint, and the servo comprises: the position sensor on the motor shaft, a motor, a gear reducer, a clutch protection mechanism for an output shaft, and a position sensor on the output shaft, and wherein the position sensor on the motor shaft is for detecting a rotational angle of the motor shaft, the position sensor on the output shaft is for detecting a rotational angle of the output shaft, and the near reducer realizes a deceleration of the motor shaft to the output shaft;
    obtaining data of the position sensor on the output shaft of the servo;
    determining whether a clutch protection has been performed on the servo based on data of the position sensor on the motor shaft and data of the position sensor on the output shaft; and
    calibrating a position of the motor shaft based on the data of the position sensor on the output shaft, in response to the clutch protection having been performed on the servo.

2. The method of claim 1, wherein the step of determining whether the clutch protection has been performed on the servo based on the data of the position sensor on the motor shaft and the data of the position sensor on the output shaft comprises:
    calculating a position estimation value of the output shaft based on the data of the position sensor on the motor shaft;
    calculating a difference between the position estimate value of the output shaft and the data of the position sensor on the output shaft;
    determining whether an absolute value of the difference is larger than a clutch protection threshold;
    determining the clutch protection having been performed on the servo, in response to the absolute value of the difference being larger than the clutch protection threshold; and
    determining the clutch protection having not been performed on the servo, in response to the absolute value of the difference being smaller than or equal to the clutch protection threshold.

3. The method of claim 2, wherein the step of calculating the position estimation value of the output shaft based on the data of the position sensor on the motor shaft comprises:
    calculating the position estimation value of the output shaft based on the data of the position sensor on the motor shaft and a reduction ratio of the gear reducer of the servo.

4. The method of claim 3, wherein the position estimation value of the output shaft refers to a position of the output shaft calculated based on the data of the position sensor on the motor shaft, and the data of the position sensor on the motor shaft is divided by the reduction ratio of the gear reducer of the servo to obtain the position estimation value of the output shaft.

5. The method of claim 1, wherein before the step of obtaining the data of the position sensor on the motor shaft of the servo comprises:
    powering on the servo, and performing a position calibration on the position sensor on the motor shaft using the position sensor on the output shaft of the servo; and
    wherein after the calibration, an actual position control of the servo is based on data of the position sensor on the motor shaft, and a position of the output shaft is calculated through a reduction ratio of the near reducer.

6. The method of claim 1, wherein the step of calibrating the position of the motor shaft based on the data of the position sensor on the output shaft comprises:
    calculating the position estimation value of the motor shaft based on the data of the position sensor on the data of the position sensor on the output shaft and the reduction ratio of the gear reducer of the servo; and
    adjusting the motor shaft a position corresponding to the position estimation value.

7. The method of claim 6, wherein the position estimate value of the motor shaft is a product of the data of the position sensor on the output shaft and the reduction ratio of the gear reducer of the servo.

8. The method of claim 1, wherein the data of the position sensor on the motor shaft refers to a rotational angle of the motor shaft at a current position of the motor shaft with respect to an initial position of the motor shaft.

9. The method of claim 1, wherein the data of the position sensor on the output shaft refers to a rotational angle of the output shaft at a current position of the output shaft with respect to an initial position of the output shaft.

10. The method of claim 1, wherein the steps further comprises:

determining that the motor not needs to be calibrated, in response to the clutch protection having not been performed on the servo, and continuously obtaining the data of the position sensor on the motor shaft and the data of the position sensor on the output shaft to determine whether the clutch protection has been performed.

11. A calibration apparatus for a servo, comprising:
a first obtaining module configured to obtain data of a position sensor on a motor shaft of the servo, wherein the servo is used as a joint of a robot so as to realize a movement of a limb of the robot which is connected to the joint, and the servo comprises: the position sensor on the motor shaft, a motor, a gear reducer, a clutch protection mechanism for an output shaft, and a position sensor on the output shaft, and wherein the position sensor on the motor shaft is for detecting a rotational angle of the motor shaft, the position sensor on the output shaft is for detecting a rotational angle of the output shaft, and the gear reducer realizes a deceleration of the motor shaft to the output shaft;
a second obtaining module configured to obtain data of the position sensor on the output shaft of the servo;
a clutch determining module configured to determine whether a clutch protection has been performed on the servo based on data of the position sensor on the motor shaft and data of the position sensor on the output shaft; and
a position calibrating module configured to calibrate a position of the motor shaft based on the data of the position sensor on the output shaft, in response to the clutch protection having been performed on the servo.

12. The apparatus of claim 11, wherein the clutch determining module comprises:
a first calculating unit configured to calculate a position estimation value of the output shaft based on the data of the position sensor on the motor shaft;
a second calculating unit configured to calculate a difference between the position estimate value of the output shaft and the data of the position sensor on the output shaft;
a threshold determining unit configured to determine whether an absolute value of the difference is larger than a clutch protection threshold;
a first determining unit configured to determine the clutch protection having been performed on the servo, in response to the absolute value of the difference being larger than the clutch protection threshold; and
a second determining unit configured to determine the clutch protection having not been performed on the servo, in response to the absolute value of the difference being smaller than or equal to the clutch protection threshold.

13. The apparatus of claim 12, wherein the first calculating unit is configured to:
calculate the position estimation value of the output shaft based on the data of the position sensor on the motor shaft and a reduction ratio of the gear reducer of the servo.

14. The apparatus of claim 11, further comprising:
a servo power-on module configured to power on the servo, and performing a position calibration on the position sensor on the motor shaft using the position sensor on the output shaft of the servo; and
wherein after the calibration, an actual position control of the servo is based on data of the position sensor on the motor shaft, and a position of the output shaft is calculated through a reduction ratio of the gear reducer.

15. The apparatus of claim 11, wherein the position calibrating module is configured to:
calculate the position estimation value of the motor shaft based on the data of the position sensor on the data of the position sensor on the output shaft and the reduction ratio of the gear reducer of the servo; and
adjust the motor shaft a position corresponding to the position estimation value.

16. A robot comprising:
at least a servo, wherein the servo is used as a joint of the robot so as to realize a movement of a limb of the robot which is connected to the joint, and the servo comprises: the position sensor on the motor shaft, a motor, a gear reducer, a clutch protection mechanism for an output shaft, and a position sensor on the output shaft, and wherein the position sensor on the motor shaft is for detecting a rotational anele of the motor shaft, the position sensor on the output shaft is for detecting a rotational angle of the output shaft, and the gear reducer realizes a deceleration of the motor shaft to the output shaft;
a memory;
a processor; and
one or more computer programs stored in the memory and executable on the processor, wherein the one or more computer programs comprise:
instructions for obtaining data of a position sensor on the motor shaft of the servo;
instructions for obtaining data of a position sensor on the output shaft of the servo;
instructions for determining whether a clutch protection has been performed on the servo based on data of the position sensor on the motor shaft and data of the position sensor on the output shaft; and
instructions for calibrating a position of the motor shaft based on the data of the position sensor on the output shaft, in response to the clutch protection having been performed on the servo.

17. The robot of claim 16, wherein the instructions for determining whether the clutch protection has been performed on the servo based on the data of the position sensor on the motor shaft and the data of the position sensor on the output shaft comprise:
instructions for calculating a position estimation value of the output shaft based on the data of the position sensor on the motor shaft;
instructions for calculating a difference between the position estimate value of the output shaft and the data of the position sensor on the output shaft;
instructions for determining whether an absolute value of the difference is larger than a clutch protection threshold;
instructions for determining the clutch protection having been performed on the servo, in response to the absolute value of the difference being larger than the clutch protection threshold; and
instructions for determining the clutch protection having not been performed on the servo, in response to the absolute value of the difference being smaller than or equal to the clutch protection threshold.

18. The robot of claim 17, wherein the instructions for calculating the position estimation value of the output shaft based on the data of the position sensor on the motor shaft comprise:

instructions for calculating the position estimation value of the output shaft based on the data of the position sensor on the motor shaft and a reduction ratio of the gear reducer of the servo.

19. The robot of claim 16, wherein the one or more computer programs further comprise:
   instructions for powering on the servo, and performing a position calibration on the position sensor on the motor shaft using the position sensor on the output shaft of the servo; and
   wherein after the calibration, an actual position control of the servo is based on data of the position sensor on the motor shaft, and a position of the output shaft is calculated through a reduction ratio of the Year reducer.

20. The robot of claim 16, wherein the instructions for calibrating the position of the motor shaft based on the data of the position sensor on the output shaft comprise:
   instructions for calculating the position estimation value of the motor shaft based on the data of the position sensor on the data of the position sensor on the output shaft and the reduction ratio of the gear reducer of the servo; and
   instructions for adjusting the motor shaft a position corresponding to the position estimation value.

* * * * *